United States Patent [19]
Simkowski et al.

[11] Patent Number: 5,570,977
[45] Date of Patent: Nov. 5, 1996

[54] FLUID CONVEYOR FOR ARTICLES

[75] Inventors: Donald J. Simkowski, Loveland; Thomas M. Ingraham, Fort Collins, both of Colo.

[73] Assignee: Goldco Industries, Inc., Loveland, Colo.

[21] Appl. No.: 403,187

[22] Filed: Mar. 13, 1995

[51] Int. Cl.⁶ .................................................. B65G 51/03
[52] U.S. Cl. ............................................................ 406/88
[58] Field of Search ........................... 406/86, 88; 226/7, 226/97; 34/359, 432, 576, 579, 580, 581, 582, 583, 584, 585

[56] References Cited

U.S. PATENT DOCUMENTS

| | | | |
|---|---|---|---|
| 1,515,965 | 11/1924 | Pardee | 406/88 X |
| 3,105,720 | 10/1963 | Barker | 406/88 |
| 3,180,688 | 4/1965 | Futer | 406/88 |
| 3,475,058 | 10/1969 | Sanders | 406/88 |
| 3,477,764 | 11/1969 | Smith | 406/88 |
| 3,647,266 | 3/1972 | Hurd et al. | 406/83 |
| 3,684,327 | 8/1972 | Hurd | 406/86 |
| 3,734,567 | 5/1973 | Fong | 406/86 |
| 3,953,076 | 4/1976 | Hurd | 406/88 |
| 3,975,057 | 8/1976 | Hurd | 406/84 |
| 3,999,806 | 12/1976 | Hurd | 406/181 |
| 4,010,981 | 3/1977 | Hodge | 406/88 |
| 4,229,861 | 10/1980 | Campo et al. | 19/161.1 |
| 4,347,022 | 8/1982 | Lenhart | 406/88 |
| 4,369,005 | 1/1983 | Lenhart | 406/88 |
| 4,392,760 | 7/1983 | Futer | 406/88 |
| 4,500,229 | 2/1985 | Cole et al. | 406/88 |
| 4,561,806 | 12/1985 | Lenhart | 406/88 |
| 4,568,223 | 2/1986 | Lenhart | 406/88 |
| 4,730,956 | 3/1988 | Lenhart | 406/88 |
| 4,732,513 | 3/1988 | Lenhart | 406/88 |
| 4,828,434 | 5/1989 | Fairman et al. | 406/88 |

*Primary Examiner*—Andrew C. Pike
*Attorney, Agent, or Firm*—Robert E. Harris

[57] ABSTRACT

A fluid conveyor effects movement of articles, such as cans, along a predetermined path adjacent to a thin deck plate. The thin deck plate has fluid distribution areas formed therein with each fluid distribution area having an aperture formed therein, after which a flat tab section is formed that is inclined with respect to the remainder of the plate. Each tab section therefore has an aperture therein through which fluid from a fluid supply unit is injected under pressure into the article path adjacent to the plate in a direction and angle determined by the orientation of the tab sections to effect movement of articles along the article path. Each tab section has a portion integral with the remainder of the plate and side and end edge portions unattached to the remainder of the plate but sufficiently contiguous thereto to prevent passage of air between the edge portions and the remainder of the plate. The fluid conveyor can also include one or more turns between upstream and downstream sections, with first and second groups of tab sections being positioned to inject fluid in the upstream section to effect article movement and with the second group of tab sections being positioned in the downstream section to effect article movement.

26 Claims, 2 Drawing Sheets

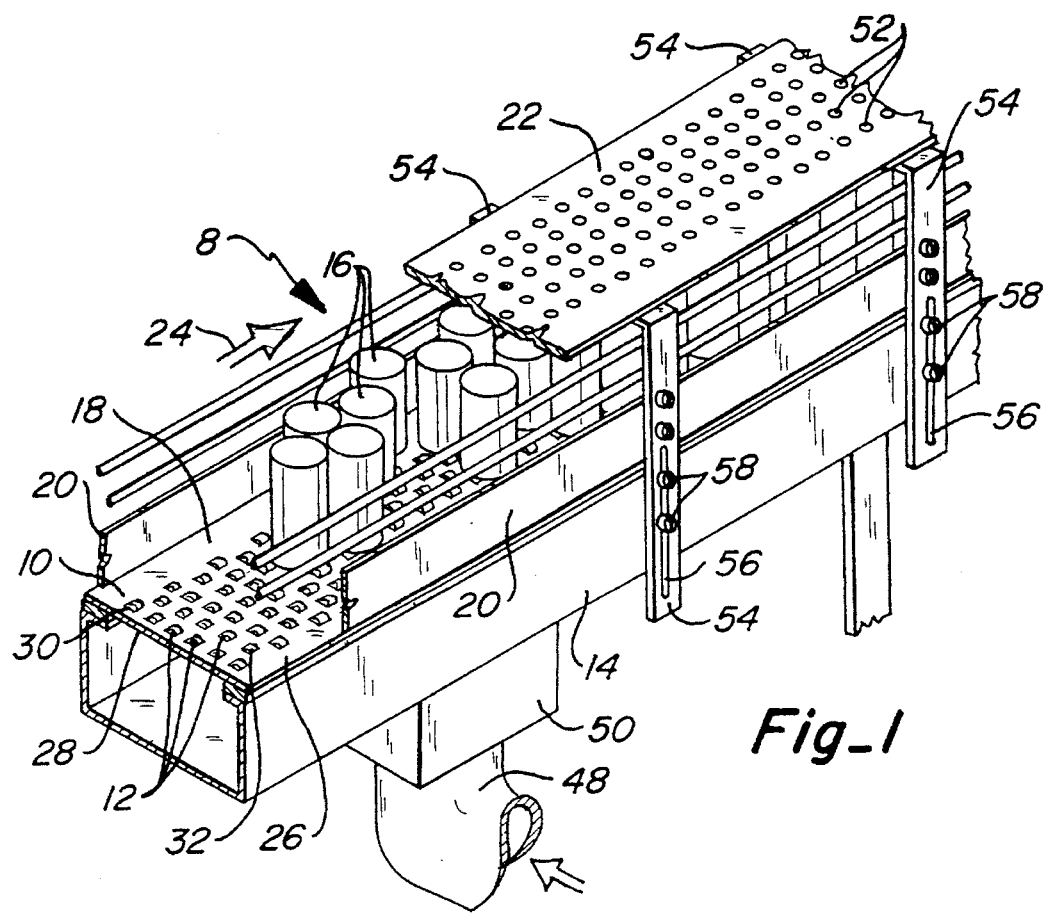
Fig_1
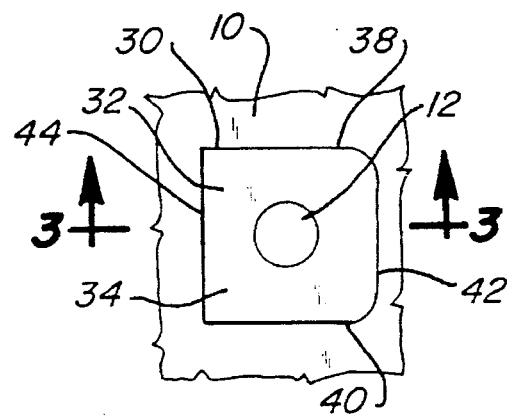
Fig_2
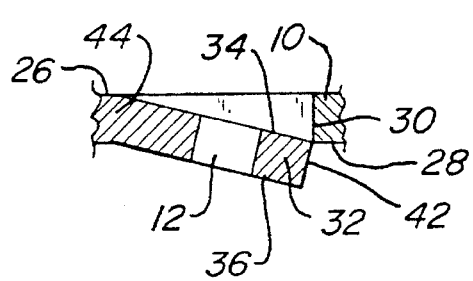
Fig_3

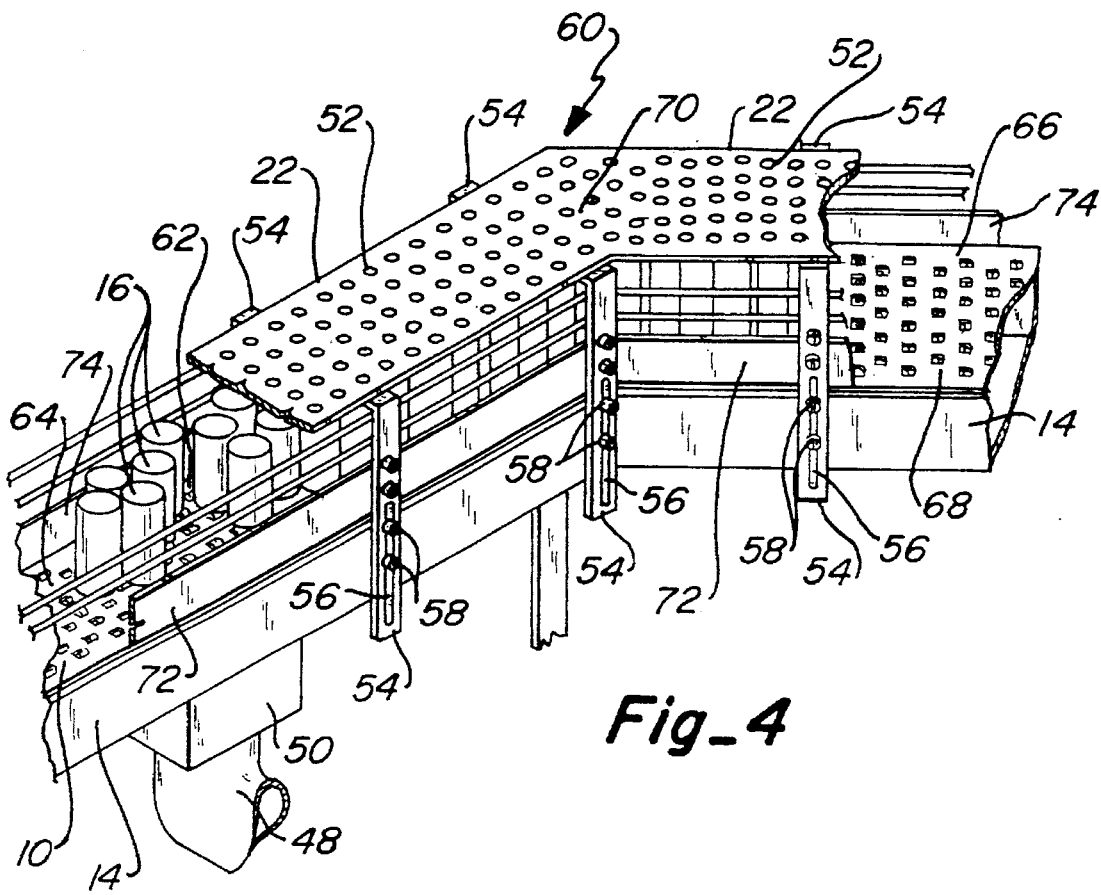
Fig_4
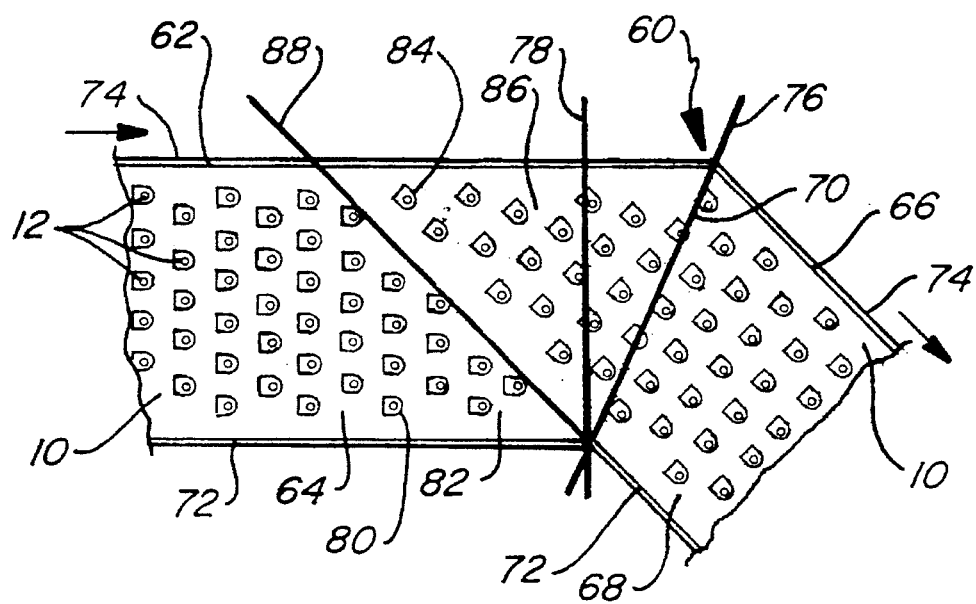
Fig_5

's,570,977

FLUID CONVEYOR FOR ARTICLES

FIELD OF THE INVENTION

This invention relates to article conveying, and, more particularly, relates to a fluid conveyor for effecting movement of articles along a predetermined path.

BACKGROUND OF THE INVENTION

Devices for effecting movement of articles, for example cans, bottles, and the like, utilizing fluid (normally air) are now well known (see, for example, U.S. Pat. No. 4,500,229).

Now known fluid conveyor systems used for movement of articles commonly use a deck plate having apertures therein and inject the fluid under pressure through the apertures at an angle with respect to the deck plate to provide fluid drive to move articles adjacent to the deck plate, and also sometimes inject fluid through other apertures vertical to the deck plate to lift the moving articles from the plate to reduce friction as the articles are moved relative to the deck plate (see, for example, U.S. Pat. Nos. 4,347,022, 4,730,956, and 4,732,513).

Where the deck plate utilized had sufficient thickness (normally a thickness much greater than the diameter of apertures therein used for fluid injection), the apertures could be formed at an angle with respect to the surface adjacent to the article path to thereby inject the fluid at an angle and thus provide fluid drive to move articles along the article path (see, for example U.S. Pat. Nos. 4,369,005, 4,561,806, and 4,568,223). It was found, however that this type of fluid driver, could be sensitive to contaminates in the fluid commonly found in a plant environment due to the length of the aperture passage, and this, at least in some cases, resulted in partial, or even complete, passage blockage.

To overcome use of long aperture passages, it has been suggested that a thin deck plate (normally a plate having a thickness substantially no greater than the diameter of the apertures in the plate to be used for fluid injection) be used. Due to the lack of thickness of the thin plate, however, apertures formed therein were found to be incapable of injecting fluid through the apertures at a sufficiently concentrated angle to thereby provide acceptable fluid drive of the articles.

To provide for fluid injection through a thin plate at a sufficiently concentrated angle and thus provide acceptable fluid drive to articles, several arrangements have heretofore been suggested and/or utilized. One such arrangement is to provide a slot at the deck plate by severing a portion of the deck plate and bending the severed portion away from the plate to allow fluid to pass through the thus formed slot (see, for example, U.S. Pat. Nos. 3,105,720, 3,180,688, 3,647, 266, 3,684,327, 3,734,567, 3,953,076, 3,975,057, 3,999,806, 4,010,981, 4,229,861, and 4,392,760). The slot arrangement has, however, been found, at least at times, to inject too much fluid at nearly a horizontal angle with respect to the deck plate, resulting in unacceptable article damage.

Another such arrangement for use in injecting fluid through apertures in a thin deck plate involved utilizing two plates each having apertures therein and positioning one of the plates over the other plate with the apertures in the plates partially offset from one another to provide a directional component to fluid injected through the apertures (see, for example, U.S. Pat. No. 3,475,058). The dual plate arrangement, however, has been found to sometimes collect dirt at the top plate apertures resulting, at least in some cases, in an unwanted change in the angle of fluid injection.

Still another article injection arrangement for use with a thin deck plate involved providing an aperture in the curved side wall of a depression in the deck plate so that fluid injected through the aperture would be at an angle with respect to the deck plate (see, for example, U.S. Pat. Nos. 3,477,764 and 4,828,434). It was found, however, that the needed angle of discharge of fluid through the aperture in the curved surface could normally not be uniformly and/or satisfactorily achieved, due, at least in part, to the manufacturing steps required to form the deck plate.

While devices have also been heretofore suggested and/or utilized for providing turns in the path of articles being fluid conveyed, such devices have not been completely successful, at least in some cases, in providing such turns at an acceptable rate of movement of the articles along the path, without causing undue disruptions due to article blockages and/or without inflicting unacceptable damage to the articles being moved along the path.

SUMMARY OF THE INVENTION

This invention provides an improved fluid conveyor and deck plate thereof, including improved injection of fluid through the plate at plural fluid distribution areas to better effect movement of articles along an article movement path, improved path turns where needed, and an improved method for forming the deck plate, all with a view toward simplifying article conveyance, maintaining article quality, and/or simplifying plate formation and use.

More particularly, a thin plate is utilized having a plurality of fluid distribution areas therein with each of the fluid distribution areas having a flat tab section, or wall, that is inclined with respect to the remainder of the plate, with the tab section having edge portions that are unattached but contiguous to the remainder of the plate, and with the tab section having an aperture therein through which fluid is discharged into an article movement path adjacent to the plate to urge articles along the path in a preselected direction.

It is therefore an object of this invention to provide an improved fluid conveyor.

It is another object of this invention to provide an improved fluid conveyor and deck plate thereof.

It is still another object of this invention to provide an improved fluid conveyor and deck plate thereof having improved fluid injection through apertures in said deck plate to better effect movement of articles along an article movement path.

It is still another object of this invention to provide an improved thin deck plate for fluid conveying of articles.

It is still another object of this invention to provide an improved thin deck plate having a plurality of fluid distribution areas each of which has a flat tab section, or wall, that is inclined with respect to the remainder of the plate, with said tab section having edge portions unattached but contiguous to the remainder of the plate and an aperture in the tab section through which fluid is injected to move articles in a preselected direction along a predetermined path adjacent to the plate.

It is still another object of this invention to provide an improved fluid conveyor having improved path turns.

It is still another object of this invention to provide an improved method for forming deck plates for fluid conveyance of articles along an article movement path.

With these and other objects in view, which will become apparent to one skilled in the art as the description proceeds, this invention resides in the novel construction, combination, arrangement of parts, and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a partial perspective view of the fluid conveyor of this invention;

FIG. 2 is a partial top view of the deck plate shown in FIG. 1 illustrating one of the plurality of fluid distribution areas shown in FIG. 1;

FIG. 3 is a cross-section view taken through lines 3—3 of FIG. 2;

FIG. 4 is a partial perspective view of a fluid conveyor such as shown in FIG. 1 and illustrating a turn in the article movement path thereof; and FIG. 5 is a simplified partial top view of the deck plate of the fluid conveyor shown in FIG. 4 and particularly illustrating the grouping of apertures to effect a turn.

DESCRIPTION OF THE INVENTION

As best shown in FIG. 1, fluid conveyor, or conveying device, 8 includes a deck plate 10 having apertures 12 therein communicating with plenum 14 for supplying fluid (normally air) under pressure through the apertures to urge articles 16, such as cans (or other cylindrical articles such as bottles, for example), along article movement path 18 having guide rails 20 at opposite sides thereof and a top plate, or cover, 22 above the articles moved along path 18, with the articles being moved in the downstream direction along path 18 as indicated by arrow 24.

Deck plate 10 is preferably a thin plate having flat opposite surfaces 26 and 28 parallel to one another and spaced from one another a short distance establishing, or defining, the thickness of the plate.

Plate 10 also has a series of fluid distribution areas 30 therein. As indicated in FIG. 1, fluid distribution areas 30 are preferably uniformly spaced across and along plate 10 and provide fluid drive through apertures 12 to urge articles along path 18.

As best shown in FIGS. 2 and 3, each fluid distribution area 30 has an inclined tab section, or wall, 32 therein, and each tab section includes flat opposite surfaces 34 and 36 parallel to and spaced from one another. In addition, each tab section has an aperture 12 therein opening to the opposite surfaces 34 and 36.

With deck plate 10 being a thin plate (i.e., having a thickness not appreciably greater than the diameter of the aperture 12 therein), aperture 12 in each tab section 32 imparts, of itself, insufficient direction to fluid discharged therethrough to provide satisfactory drive to articles. Direction is therefore provided for fluid discharged through the apertures by the inclination and orientation of the flat tab sections having the apertures therethrough.

Tab sections 32 are identically oriented (except at a path turn as brought out more fully hereinafter) and identically inclined with respect to the remainder of the plate so that fluid is injected through the aperture in each tab section in the same direction and angle (except, as brought out above, at a path turn).

Apertures 12 are first formed in the plate, preferably by punching a hole vertical to surfaces 26 and 28 through the thin plate at each intended fluid distribution area 30. After the apertures have been formed in the plate, inclined tab sections 32 are formed with an aperture 12 in each of the tab sections, preferably by providing tab sections that are integral with the remainder of the plate by using a punch to pierce the plate in the area surrounding each aperture to thereby sever the tab opposite side edges 38 and 40 and tab end edge 42 from the remainder of the plate and bending the tab section relative to the plate at the resulting junction 44 of the tab section then being formed in the plate.

As can be best seen in FIG. 3, the angle of inclination of tab sections 32 with respect to the remainder of the plate determines the angle of fluid drive imparted to articles above the top surface 26 of the plate during normal operation of the fluid conveyor. In addition, by orienting the tab sections so that the sections are positioned normal to article movement path 18, as indicated in FIGS. 1 and 2, the direction of the imparted drive due to discharge of fluid through apertures 12 is parallel to article movement path 18 and is therefore parallel to the intended downstream direction of article movement along article movement path 18 (it is to be realized that since path 18 is wider than the articles being moved along the path the articles may sometimes be temporarily deviated from the intended path of travel due to, for example, coming into contact with slower moving articles).

As best shown in FIG. 3, each tab section 32 is inclined so that top surface 34 (i.e., the surface at the side of the tab section adjacent to article movement path 18) extends at an angle from plate top surface 26 toward plate bottom surface 28. As best shown in FIGS. 2 and 3, the angle of each inclined tab section relative to the remainder of the plate is preferably such that tab opposite edges 38 and 40 and tab end edge 42 remain contiguous to the remainder of the plate and, while the edges 38, 40, and 42 are unattached to the remainder of the plate, best results are obtained when edge portions 38, 40 and 42 remain sufficiently close, or contiguous, to the remainder of the plate to assure that fluid will not pass between the edges and the remainder of the plate.

It has been found that an angle of inclination of the tab sections relative to the remainder of the plate that is best utilized is between 10° and 20° with 15° being now preferred. As can be seen from FIG. 3, the greatest angle of the tab section assuring no escape of fluid between the edges of the tab section and the remainder of the plate occurs when tab end portion 42 is contiguous to plate bottom surface 28. For a 16 gauge stainless steel plate, this angle has been found to be about 15°.

Fluid to be injected through apertures 12 is contained under pressure at plenum 14 positioned below plate 10, with plate 10 providing the top, or cover, for the plenum. Fluid is supplied to the plenum through fluid supply duct 48 and second plenum 50 (plenum 50 can include a fluid compressor for maintaining the fluid at plenum 14 under a desired pressure if, for example, the fluid supplied through duct 48 is not supplied at the desired pressure).

Top plate, or cover, 22 preferably has vent apertures 52 therein and cover 22 is positioned a distance from deck plate 10 slightly greater than the height of articles to pass along path 18 between the deck plate and the cover. Cover 22 is positioned above deck plate 10 by mounting bars 54 extending between the edge of cover 22 and plenum 14, with adjustment of the cover being provided by a notch 56 in each mounting bar 54 and bolts 58 extending through notch 56 in the mounting bars into the side walls of plenum 14.

Side rails, or bars, 20, serving as article guides, are mounted on mounting bars 54 and cooperative with plate 10 define, or establish, article movement path 18.

An improved arrangement for providing one or more turns in the article movement path is shown in FIGS. 4 and 5. As indicated, each turn 60 is effected by joining upstream article movement path 62 of upstream section 64 with downstream article movement path 66 of downstream section 68 at junction 70. Inner rails, or guides, 72 of the article movement paths of the upstream and downstream sections are joined, as are the outer rails, or guides, 74 of the article movement paths of the upstream and downstream sections.

As indicated in FIG. 5, line 76 through the junctions of the inner and outer rails forms an angle with line 78 normal to upstream article movement path 62 of upstream section 64 (i.e., prior to the turn being effected) that is equal to one-half of the angle of the turn being effected.

It has presently been found that a turn greater than about 45° should be made in increments, i.e., by effecting plural smaller turns. A 90° turn is thus effected, for example, by using two 45° turns.

Fluid is directed downstream in downstream article movement path 66 parallel to the path in the same manner as set forth above with respect to path 18. In upstream section 64, fluid is directed downstream in upstream article movement path 62 parallel to the path in the same manner as set forth above with respect to path 18 except near junction 70 of the sections.

As best shown in FIG. 5, near junction 70, one group 80 of apertures directs fluid downstream parallel to article movement path 62 of upstream section 64 through a diminishing part 82 of the inner side of upstream article movement path 62 to junction 70, while a second group 84 of apertures directs fluid downstream parallel to article movement path 66 through an increasing part 86 of the outer side of upstream article movement path 62 to junction 70, with the division between the groups occurring along a line 88 through inner rail 72 of article movement path 66 of downstream section 68 and extending therefrom across article movement path 62 of upstream section 64 to outer rail 74 of article movement path 62.

In normal operation, articles are urged along path 18 by fluid injected under pressure from plenum 12 into the article movement path through apertures 12 in tab sections 32.

It has been found that acceptable article flow can be achieved using a thin deck plate (preferably a 16 gauge stainless steel plate having a thickness of about 0.06 inches) with fluid distribution areas therein (preferably with the fluid distribution areas being in a stagger pattern of longitudinally extending rows having the fluid distribution areas of adjacent rows offset from one another and the apertures in the fluid distribution areas being spaced from one another about ⅝ inches center-to-center), an inclined tab section at each of the fluid distribution areas having an aperture therein (preferably with the tab sections being about one-fourth inches square with an aperture therein having a diameter of about 0.07 inches and inclined at an angle of about 15° with respect to the remainder of the plate), and a plenum under pressure (preferably under a static pressure of about one and one-half inches of water). Utilizing the foregoing, a flow rate of articles (such as 12-ounce aluminum beverage cans) can be achieved along article movement path 18 of between about 350 and 400 articles per minute, with the article flow rate being maintainable through turns made in the flow path according to this invention.

As may be appreciated from the foregoing, this invention provides an improved fluid conveyor and/or deck plate thereof, as well as improved turns in a fluid conveyor and an improved method for forming a deck plate for a fluid conveyor.

What is claimed is:

1. A device for effecting movement of articles along a predetermined path in a preselected direction, said device comprising:

a plate including a first portion and a plurality of second portions having substantially flat tab sections each of which has a first portion connected to said first portion of said plate and at least one edge portion unattached to said first portion of said plate, said tab sections extending from and inclined with respect to said first portion of said plate and each of said tab sections having an aperture therethrough;

article guide means cooperable with said first portion of said plate to define the predetermined path for the articles adjacent to said plate; and fluid supply means adjacent to said plate, said fluid supply means supplying fluid, during normal operation of said device, through said apertures in said tab sections of said second portions of said plate with said fluid being discharged from said apertures in a direction to thereby urge the articles along the predetermined path in the preselected direction.

2. The device of claim 1 wherein said plate has a thickness substantially no greater than a diameter of said apertures in said tab sections.

3. The device of claim 1 wherein each of said tab sections has first and second opposite edge portions unattached to said first portion of said plate.

4. The device of claim 3 wherein each of said tab sections further has a third edge portion extending between said first and second opposite edge portions, said third edge portion being unattached to said first portion of said plate.

5. The device of claim 4 wherein said first, second and third edge portions of said tab sections are contiguous to said first portion of said plate to substantially block fluid passage therebetween.

6. The device of claim 1 wherein said first portion of said plate has first and second spaced surfaces establishing a thickness of said plate, wherein each of said inclined tab sections has an end portion that includes said one edge portion of said inclined tab sections and a first surface extending from and inclined with respect to said first surface of said first portion of said plate with said first surface of each of said inclined tab sections extending to said end portion of each of said inclined tab sections, and wherein said first surface of each of said inclined tab sections is contiguous to said first portion of said plate at said end portion of each of said tab sections.

7. The device of claim 6 wherein said first surface of each of said inclined tab sections is contiguous to said second surface of said first portion of said plate at said end portion of each of said inclined tab sections.

8. The device of claim 6 wherein said tab sections have side portions extending to said end portions of said tab sections, with said side portions being contiguous and unattached to said first portion of said plate.

9. The device of claim 1 wherein said tab sections are inclined at an angle of between about 10° and 20° with respect to said first portion of said plate.

10. The device of claim 9 wherein said tab sections are inclined at an angle of about 15° with respect to said first portion of said plate.

11. The device of claim 1 wherein the predetermined path comprises a first predetermined path including a downstream portion, wherein the device further includes a second predetermined path downstream from and connected with said downstream portion of the first predetermined path to establish a turn thereat, wherein said tab sections of said second portions of said plate include first and second groups of said tab sections at said downstream portion of the first predetermined path and oriented to provide first and second groups of said apertures with the fluid discharged from said first group of said apertures being directed substantially parallel to the first predetermined path and with the fluid discharged from said second group of said apertures being directed substantially parallel to said second predetermined path.

12. The device of claim 11 wherein said second predetermined path has a substantially straight downstream inner guide, wherein said first group of said tab sections is positioned at said downstream portion of the first predetermined path upstream of a straight line extending through said downstream portion of the first predetermined path and through said downstream inner guide of said second predetermined path, and wherein said second group of said tab sections is positioned downstream of said straight line extending through said downstream portion of the predetermined path.

13. The device of claim 12 wherein said turn is no greater than about 45°.

14. The device of claim 1 wherein the articles are cans, and wherein said fluid used to urge said cans along the predetermined path is air.

15. A device for injecting fluid into a predetermined article movement path to effect movement of articles along the path in a preselected downstream direction, said device comprising:

a thin plate including a first portion having first and second substantially planar opposite surfaces with said surfaces being substantially parallel to and spaced from one another a distance defining a thickness of said plate and with said first surface being adjacent to the articles moved along the article movement path, said plate also including a plurality of second portions providing fluid distribution areas with each of said second portions including a wall, said wall having a first portion integral with said first portion of said plate, an end portion unattached but contiguous to said first portion of said plate, and a second portion having substantially planar first and second opposite surfaces extending between said first portion and said end portion of said wall with said second portion of said wall being inclined at an inclination with respect to said first portion of said plate and having an aperture therein extending between said first and second opposite surfaces of said wall whereby the fluid directed through said aperture in said wall from said second surface of said second portion of said wall to said first surface of said second portion of said wall is injected into the predetermined article movement path at an angle dependent upon said inclination of said wall; and fluid supply means adjacent to said second surface of said first portion of said plate with said fluid supply means, during normal operation of said device, supplying the fluid through said apertures extending from said second surface of said second portions of said walls to said first surface of said second portions of said walls.

16. The device of claim 15 wherein said second portion of said wall of each of said second portions of said plate has opposite side edges that extend from said first portion of said wall of each of said second portions of said plate to said end portion of said wall of each of said second portions of said plate with said side edges being unattached to said first portion of said plate.

17. The device of claim 16 wherein said opposite side edges and said end portion of said wall of each of said second portions of said plate are sufficiently contiguous to said first portion of said plate to thereby substantially block fluid passage therebetween.

18. A device for injecting fluid into a predetermined article movement path having an upstream section, a downstream section, and a turn between the upstream section and the downstream section to effect movement of articles along the article movement path in first and second downstream directions, said device comprising:

a plate at the article movement path, said plate having a first portion adjacent to the upstream section of the article movement path and a second portion adjacent to the downstream section of the article movement path;

first and second groups of inclined apertures at said plate for injecting the fluid through said apertures into the article movement path, said first group of apertures being positioned at said first portion of said plate and inclined to inject the fluid into the upstream section of the article movement path in said first downstream direction substantially parallel to the upstream section of the article movement path, and said second group of apertures being positioned at both said first and second portions of said plate and inclined to inject the fluid into both the upstream and downstream sections of the article movement path in said second downstream direction substantially parallel to the downstream section of the article movement path; and fluid supply means supplying the fluid to be injected through said first and second group of apertures during normal operation of the device.

19. The device of claim 18 wherein the downstream section of the article movement path has a substantially straight downstream inner guide, wherein said first group of apertures is positioned upstream of a straight line extending through the upstream section of the article movement path and through said downstream inner guide of the downstream section, and wherein said second group of apertures is positioned downstream of said straight line extending through the upstream section of the article movement path.

20. The device of claim 19 wherein the downstream section of the article movement path also has a substantially straight downstream outer guide with an upstream termination of said downstream inner and outer guides being along a straight line that is at an angle with respect to a straight line normal to the upstream section of the article movement path with said angle being substantially equal to one-half of the turn being effected.

21. A method for forming fluid distribution areas in a thin deck plate to be used to inject fluid into an article movement path adjacent to the thin deck plate to effect movement of articles along the path in a preselected downstream direction, said method comprising:

selecting first and second portions of the thin deck plate with said second portions of said thin deck plate to be fluid distribution areas;

forming an aperture in each of said selected fluid distribution areas of the thin deck plate; and forming tab sections at each of said selected fluid distribution areas of the thin deck plate with each said tab section having substantially flat surfaces and having said formed aperture therein, each of said tab sections also having opposite side edges and an end edge severed from said first portion of the thin deck plate, and each of said tab sections being inclined at an inclination with respect to said first portion of the thin deck plate whereby said inclination of said tab sections determines the injection of the fluid directed through said apertures in said tab sections.

22. The method of claim 21 wherein said step of forming said aperture in each of said selected fluid distribution areas includes forming said apertures by punching holes in the thin deck plate prior to said forming of said tab sections, and wherein said step of forming said inclined tab sections includes punching the thin deck plate at said fluid distribution areas to pierce the thin deck plate and thereby sever said edges of said tab sections and bending said tab sections relative to said first portion of the thin deck plate along a portion thereof that remains unsevered from said first portion of the thin deck plate.

23. The method of claim 21 wherein said step of forming said aperture in each of said selected fluid distribution areas includes forming said apertures to have a diameter substantially no greater than a thickness of the thin deck plate.

24. The method of claim 21 wherein said step of forming said inclined tab sections includes inclining said tab sections at an angle no greater than an angle that insures that said severed edges of said tab sections are positioned sufficiently contiguous to said first portion of the thin deck plate to substantially prevent fluid passage therebetween.

25. The method of claim 24 wherein said step of forming said inclined tab sections includes inclining said tab sections at an angle of between about 10° and 20° relative to said first portion of the thin deck plate.

26. The method of claim 25 wherein said step of forming said inclined tab sections includes inclining said tab sections at an angle of about 15° relative to said first portion of the thin deck plate.

* * * * *